United States Patent [19]

Loewenthal

[11] Patent Number: 4,890,724
[45] Date of Patent: Jan. 2, 1990

[54] CONVEYOR WITH ARTICLES CARRIERS MOUNTED ON AN ENDLESS CHAIN

[75] Inventor: Horst Loewenthal, Tiengen, Fed. Rep. of Germany

[73] Assignee: SIG Schweizerische Industrie-Gesellschaft, Neuhausen am Rheinfall, Switzerland

[21] Appl. No.: 193,781

[22] Filed: May 13, 1988

[30] Foreign Application Priority Data

May 13, 1987 [CH] Switzerland ............... 1833/87

[51] Int. Cl.$^4$ ............................................. B65G 19/26
[52] U.S. Cl. .................................. 198/732; 198/802
[58] Field of Search ................... 198/712, 731–733, 198/802, 834

[56] References Cited

U.S. PATENT DOCUMENTS 3,162,294 12/1964 Dieter .
4,068,756 1/1978 Loewenthal .
4,505,093 3/1985 Johnson .

FOREIGN PATENT DOCUMENTS 1095871 6/1955 France .
1146247 3/1985 U.S.S.R. ......................... 198/732

Primary Examiner—Joseph E. Valenza
Attorney, Agent, or Firm—Spencer & Frank

[57] ABSTRACT

A conveyor includes a conveyor track; a throughgoing slot provided in the conveyor track; an endless sprocket chain composed of chain links articulated to one another by link pins; support pins mounted on the chain and constituting an axial extension of at least some of the link pins; a plurality of article carrier units inserted on the support pins; and an article carrier lug forming an integral part of each article carrier unit and projecting through the slot for engaging an article supported on the conveyor track. The carrier body has a centering bore centered on a first one of the support pins; and a control slot receiving and being guided by a second one of the support pins. The first and second support pins are at least two consecutive chain links apart from one another. The carrier body is further provided with an aperture between the centering bore and the control slot. The aperture receives a third support pin situated between the first and second support pins.

19 Claims, 2 Drawing Sheets

CONVEYOR WITH ARTICLES CARRIERS MOUNTED ON AN ENDLESS CHAIN

BACKGROUND OF THE INVENTION

This invention relates to a conveyor—particularly for serving a packing machine—and is of the type which has an endless sprocket chain on which there are mounted a plurality of longitudinally spaced article carriers. Each article carrier is supported by cylindrical pins constituting outwardly projecting continuations of respective chain link pins and referred to hereafter as "support pins". Each carrier has an upwardly oriented carrier lug which projects through a longitudinal slot in a conveyor track and is adapted to engage articles and transmit a conveying force thereto from the sprocket chain.

A conveyor device of the above-outlined type is known and is disclosed, for example, in U.S. Pat. No. 4,068,756. According to the construction described therein, each article carrier has a carrier body and a two-arm lever articulated to the carrier body by means of a pivot pin. One arm of the lever constitutes the carrier lug proper which projects through a longitudinal slot in the conveyor track and is adapted to engage an article supported on the conveyor track. The other arm of the two-arm lever carries a roller which is guided in a cam track. By appropriately designing the shape of the cam track in the vicinity of a chain sprocket, during deflection of the chain about the sprocket the carrier lug does not impart an excessive acceleration to the article it conveys. It is a disadvantage of such a prior art construction that the mechanism for achieving the desired results is complex and furthermore, the operation is noisy.

SUMMARY OF THE INVENTION

It is an object of the invention to provide an improved conveyor of the above-outlined type from which the discussed disadvantages are eliminated.

This object and others to become apparent as the specification progresses, are accomplished by the invention, according to which, briefly stated, each article carrier has a centering bore which is in axial alignment with and traversed by a support pin constituting an external continuation of a chain link pin. A control slot provided in the carrier and situated at least two chain links apart from the centering bore is traversed by a respective support pin. The carrier further has an aperture for receiving a further support pin situated between the two support pins traversing the centering bore and the control slot, respectively. The carrier lug is a one-piece component of the generally rectangular carrier body and is situated at one end thereof.

By virtue of the invention a significant simplification is achieved inasmuch as the carrier is composed of a single component as compared to a five-component structure according to the prior art. Since, preferably, the carrier is made of a synthetic material and has no movable parts, its operation is very quiet. Further, the carrier is a very inexpensive component and may be manufactured, for example, by injection molding. Furthermore, no lubrication is necessary which is of particular significance when the conveyor is associated with a packing machine handling food products. The invention makes possible a conveyance at very high speeds. The width of each carrier is constant throughout and thus the longitudinal slot provided in the conveyor track through which the lug projects may be at all times completely filled widthwise by the carriers whereby soiling problems of the chain and its drive are avoided to a large measure. Furthermore, the invention makes possible a simple changing of the distance between the carriers by simply removing them and inserting them on support pins at a different distance from one another.

DESCRIPTION OF THE PREFERRED EMBODIMENTS

Figure 1:
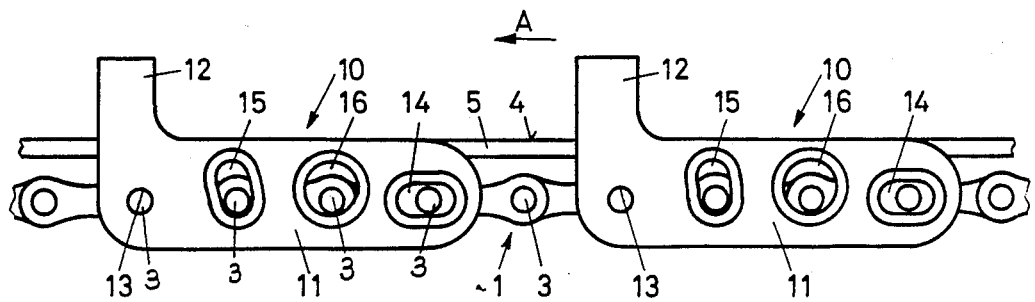
FIG. 1 is a side elevational view of a preferred embodiment of the invention.
Figure 2:
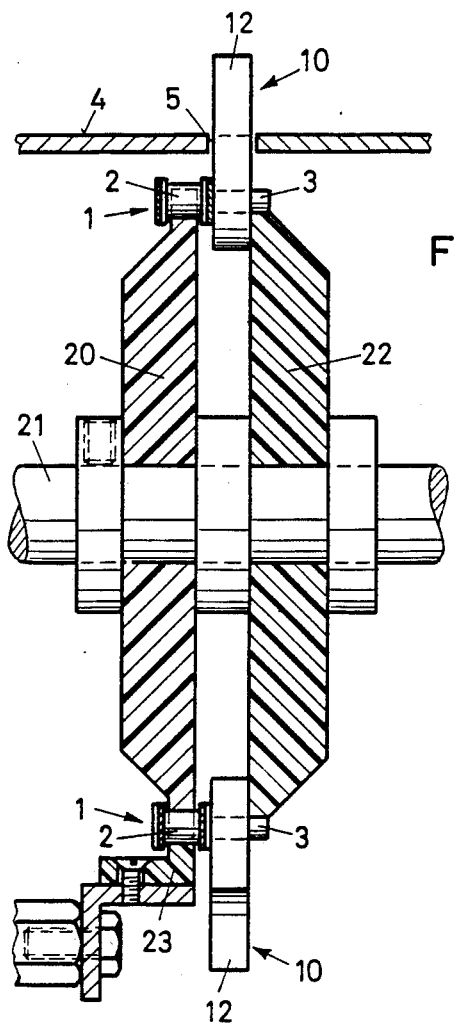
FIG. 2 is a sectional end elevational view of a chain conveyor in the zone of an end sprocket, incorporating the preferred embodiment of the invention.
Figure 3:
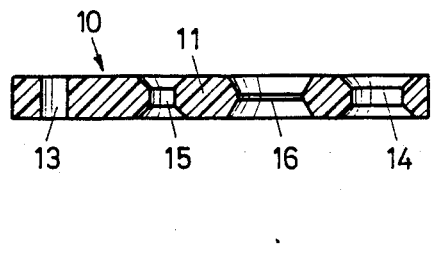
FIG. 3 is a sectional top plan view of the preferred embodiment.

Turning to FIGS. 1 and 2, the conveyor illustrated therein includes an endless sprocket chain 1 whose links are articulated to one another by link pins 2. On one side of the chain 1, each link pin 2 has an axial extension constituted by a cylindrical support pin 3. The conveyor further includes a conveyor track 4 extending parallel to the upper flight of the chain 1 and is provided with a longitudinally extending slot 5.

The chain 1 supports a plurality of spaced article carriers 10, each being inserted on several consecutive support pins 3. The carrier 10 is made of a plastic material, preferably polyamide. Each carrier 10 has a generally rectangular carrier body 11 and a carrier lug 12 which is an integral, one-piece part of the carrier body 11 and which is arranged at one end thereof. The carrier body 11 projects into the slot 5, whereas the lug 12 projects beyond the conveyor track 4.

At that end of each carrier body 11 which is adjacent the carrier lug 12 there is provided a centering bore 13 whereas at the opposite end of the carrier body 11 there is provided a control slot 14 which is spaced from the centering bore 13 three links 2 apart. The centering bore 13 and the control slot 14 are each traversed by a support pin 3. The two support pins 3 which are situated between the support pins 3 traversing the centering bore 13 and the support pin 3 traversing the control slot 14 project into respective apertures 15 and 16 of the carrier body 11. The aperture 15 situated next to the centering bore 13 is an arcuate slot which has closed opposite ends and whose center of curvature lies on the axis of the centering bore 13. The aperture 16 is a circular hole having a diameter substantially greater than that of the support pin 3. The apertures 15 and 16 permit a relative motion of the respective support pins 3 therein to thus allow the chain 2 to run about a sprocket 20 as best seen in FIG. 4.

With particular reference to FIG. 2, the chain sprocket 20 illustrated therein is affixed to a drive shaft 21. The teeth of the chain sprocket wheel 20 project into the link plates of the chain 1 between two adjoining chain link pins 2. To the shaft 21, axially spaced from the sprocket wheel 20, there is affixed a guard disc 22 which backs up the free end of each support pin 3. The lower reach of the chain 1 is supported from below by a stationary, plastic guide rail 23. A similar guide rail is also provided between the end sprockets 20 for guiding the upper reach of the chain 1, adjoining the conveyor track 4.

Figure 4:
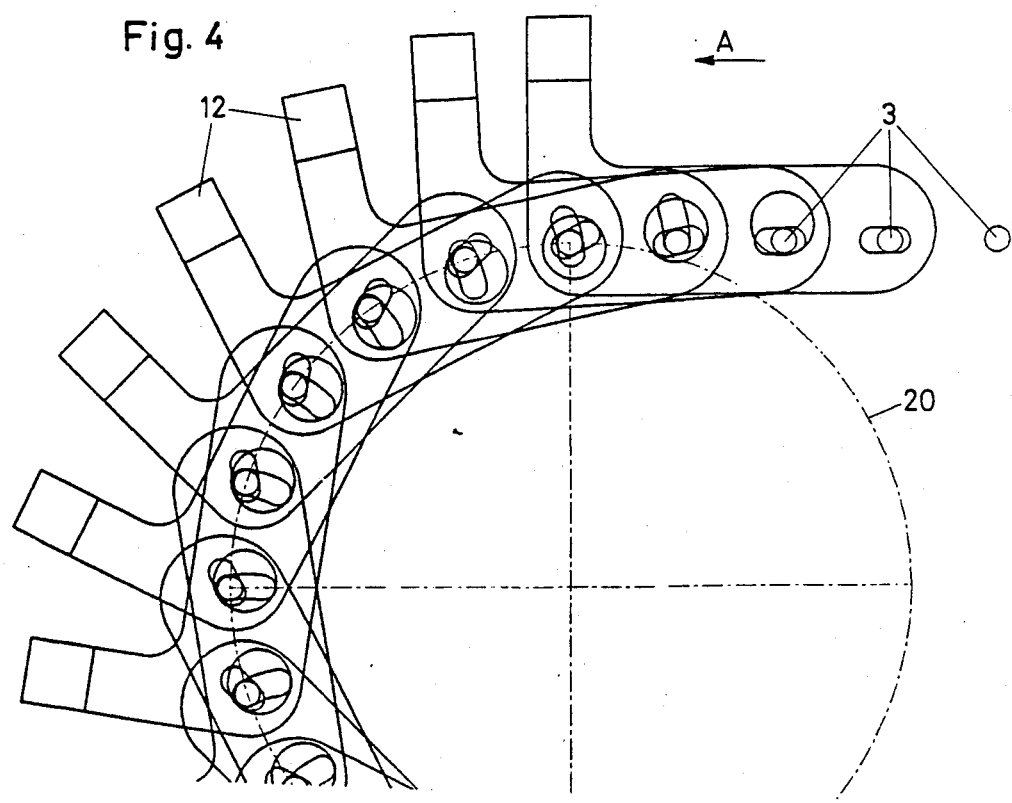
FIG. 4 is a side elevational diagrammatic view of the preferred embodiment in different positions during travel about a chain sprocket.

Turning in particular to FIG. 4, there is illustrated the course of motion of the carrier 10 as the chain 1 travels about the sprocket wheel 20 and thus changes over from the upper reach to the lower reach. The carrier 10 is illustrated in consecutive positions, one chain link apart. As may be observed, by virtue of the above-described aperture and slot assembly provided in the carrier body 11, an additional acceleration of the lug 12 in the conveying direction A is inappreciable as the chain travels about the sprocket wheel 20.

Figure 5:
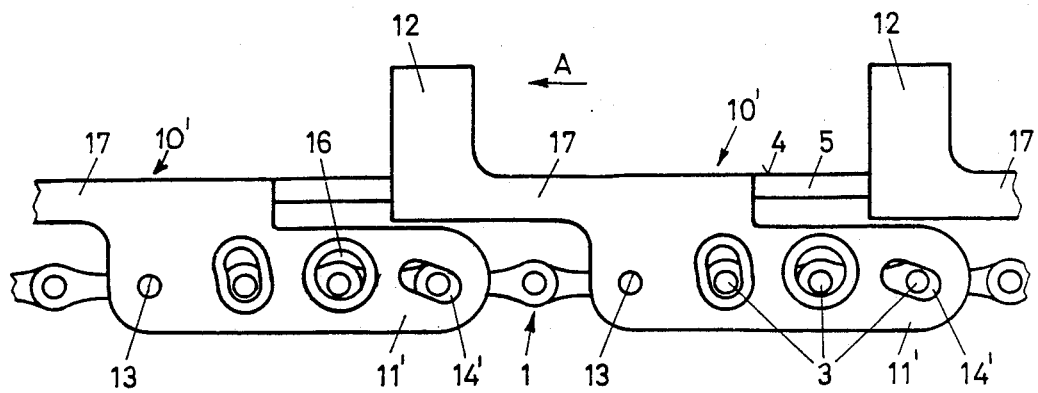
FIG. 5 is a side elevational view of another preferred embodiment of the invention.

Turning now to the embodiment illustrated in FIG. 5, the control slot 14' provided in the carrier body 11' is at an inclination relative to a line that connects the center of the centering bore 13 and the remote end of the control slot 14'. By virtue of this arrangement, during travel of the chain 1 on the end sprocket 20, thus, when the support pin 3 guided in the control slot 14' shifts forwardly in the control slot 14', the rear terminus of the carrier body 11' slightly dips and thus reduces the rocking motion of the lug 12. In this manner, the additional acceleration of the carrier lug 12 during the travel of the chain 1 about the chain sprocket 20 is further reduced. The same purpose is served in this embodiment by the fact that the lug 12 is connected with the carrier body 11' by means of a web 17 which projects forwardly, that is, in the conveying direction A. This arrangement furthermore has the advantage that the adjoining article carriers 10' are in an overlapping relationship and thus continuously close off the slot 5 in the conveyor track 4.

The present disclosure relates to subject matter contained in Swiss Patent Application No. 1833/87-7 (filed May 13, 1987) which is incorporated herein by reference.

It will be understood that the above description of the present invention is susceptible to various modifications, changes and adaptations, and the same are intended to be comprehended within the meaning and range of equivalents of the appended claims.

What is claimed is:

1. In a conveyor including a conveyor track extending in a conveying direction and arranged for supporting articles to be advanced thereon; a throughgoing slot provided in said conveyor track and extending in the conveying direction; an endless sprocket chain having a flight adjoining said conveyor track and extending parallel to said conveying direction; said sprocket chain being composed of chain links articulated to one another by link pins; support pins mounted on said chain and constituting an axial extension of at least some of the link pins; a plurality of article carrier units inserted on said support pins and arranged consecutively in said conveying direction; an article carrier lug forming part of each said article carrier unit and arranged for projecting through said slot for engaging an article supported on said conveyor track for imparting a conveying force on the article; the improvement wherein each said article carrier unit comprises (a) a carrier body having opposite ends spaced from one another in a direction parallel to a length dimension of said chain; said carrier lug being a one-piece part of said carrier body and being situated at one of said ends;

(b) a centering bore provided in said carrier body and being centered on a first one of said support pins; said carrier body being pivotal about said first support pin;

(c) a control slot provided in said carrier body and receiving and being guided by a second one of said support pins; said control slot having opposite first and second ends; said second end being more remote from said centering bore than said first end; said control slot being obliquely oriented relative to an imaginary line connecting said centering bore with said second end of said control slot; said first and second support pins being at least two consecutive said chain links apart from one another; and (d) an arcuate slot provided in said carrier body between said centering bore and said control slot; said arcuate slot having a center of curvature coinciding with a center of said centering bore; said arcuate slot receiving a third one of said support pins; said third support pin being situated between said first and second support pins; and said first and third support pins being one chain link apart.

2. A conveyor as defined in claim 1, said centering bore being situated at said one end of said carrier body.

3. A conveyor as defined in claim 1, wherein each said article carrier unit is a plastic.

4. A conveyor as defined in claim 3, wherein said plastic is a polyamide.

5. A conveyor as defined in claim 1, wherein said first and second support pins are three consecutive chain links apart.

6. A conveyor as defined in claim 1, wherein said arcuate slot has two closed opposite ends.

7. In a conveyor including a conveyor track extending in a conveying direction and arranged for supporting articles to be advanced thereon; a throughgoing slot provided in said conveyor track and extending in the conveying direction; an endless sprocket chain having a flight adjoining said conveyor track and extending parallel to said conveying direction; said sprocket chain being composed of chain links articulated to one another by link pins; support pins mounted on said chain and constituting an axial extension of at least some of the link pins; a plurality of article carrier units inserted on said support pins and arranged consecutively in said conveying direction; an article carrier lug forming part of each said article carrier unit and arranged for projecting through said slot for engaging an article supported on said conveyor track for imparting a conveying force on the article; the improvement wherein each said article carrier unit comprises (a) a carrier body having opposite ends spaced from one another in a direction parallel to a length dimension of said chain; said carrier lug being a one-piece part of said carrier body and being situated at one of said ends; said carrier lug and said carrier body having identical thicknesses as measured parallel to a width of said slot provided in said conveyor track;

(b) a centering bore provided in said carrier body and being centered on a first one of said support pins; said carrier body being pivotal about said first support pin;

(c) a control slot provided in said carrier body and receiving and being guided by a second one of said support pins; said first and second support pins being at least two consecutive said chain links apart from one another; and (d) an arcuate slot provided in said carrier body between said centering bore and said control slot; said arcuate slot having a center of curvature coinciding with a center of said centering bore; said arcuate slot receiving a third one of said support pins; said third support pin being situated between said first and second support pins; and said first and third support pins being one chain link apart;

further wherein a longitudinal marginal portion of each carrier body situated on said flight adjoining said conveyor track projects into and substantially fills, in the width direction, said slot provided in said conveyor track, and adjoining end portions of consecutive said article carrier units are in a coplanar, overlapping relationship.

8. A conveyor as defined in claim 7, further comprising an additional aperture provided in said carrier body between said control slot and said arcuate slot; said additional aperture receiving a fourth of said support pins situated between said second and said third support pins one chain link apart from each.

9. A conveyor as defined in claim 7, said centering bore being situated at said one end of said carrier body.

10. A conveyor as defined in claim 7, wherein said first and second support pins are three consecutive chain links apart.

11. A conveyor as defined in claim 7, wherein each said article carrier unit is a plastic.

12. A conveyor as defined in claim 11, wherein said plastic is a polyamide.

13. A conveyor as defined in claim 8, wherein said additional aperture is circular.

14. In a conveyor including a conveyor track extending in a conveying direction and arranged for supporting articles to be advanced thereon; a throughgoing slot provided in said conveyor track and extending in the conveying direction; an endless sprocket chain having a flight adjoining said conveyor track and extending parallel to said conveying direction; said sprocket chain being composed of chain links articulated to one another by link pins; support pins mounted on said chain and constituting an axial extension of at least some of the link pins; a plurality of article carrier units inserted on said support pins and arranged consecutively in said conveying direction; an article carrier lug forming part of each said article carrier unit and arranged for projecting through said slot for engaging an article supported on said conveyor track for imparting a conveying force on the article; the improvement wherein each said article carrier unit comprises (a) a carrier body having opposite ends spaced from one another in a direction parallel to a length dimension of said chain; said carrier lug being a one-piece part of said carrier body and being situated at one of said ends;

(b) a centering bore provided in said carrier body and being centered on a first one of said support pins; said carrier body being pivotal about said first support pin;

(c) a control slot provided in said carrier body and receiving and being guided by a second one of said support pins; said first and second support pins being at least two consecutive said chain links apart from one another;

(d) an arcuate slot provided in said carrier body between said centering bore and said control slot; said arcuate slot having a center of curvature coinciding with a center of said centering bore; said arcuate slot receiving a third one of said support pins; said third support pin being situated between said first and second support pins; said first and third support pins being one chain link apart; and (e) an additional aperture provided in said carrier body between said control slot and said arcuate slot; said additional aperture receiving a fourth of said support pins situated between said second and said third support pins one chain link apart from each.

15. A conveyor as defined in claim 14, wherein said first and second support pins are three consecutive chain links apart.

16. A conveyor as defined in claim 14, said centering bore being situated at said one end of said carrier body.

17. A conveyor as defined in claim 14, further comprising an additional aperture provided in said carrier body between said control slot and said arcuate slot; said additional aperture receiving a fourth of said support pins situated between said second and said third support pins one chain link apart from each.

18. A conveyor as defined in claim 14, wherein each said article carrier unit is a plastic.

19. A conveyor as defined in claim 18, wherein said plastic is a polyamide.

* * * * *